United States Patent [19]

Horian et al.

[11] 4,095,802
[45] Jun. 20, 1978

[54] ARM RECORD CLEANER

[76] Inventors: Richard C. Horian, 1740 Strickland Dr., Bloomfield Hills, Mich. 48013; James G. Horian, 7340 Indiana, Dearborn, Mich. 48126

[21] Appl. No.: 822,571

[22] Filed: Jul. 21, 1977

Related U.S. Application Data

[63] Continuation-in-part of Ser. No. 737,296, Nov. 1, 1976, abandoned.

[51] Int. Cl.² .............................................. G11B 3/58
[52] U.S. Cl. ...................................................... 274/47
[58] Field of Search .................................... 274/47, 23

[56] References Cited

U.S. PATENT DOCUMENTS

| | | | |
|---|---|---|---|
| 2,329,526 | 9/1943 | Germeshausen | 274/1 R |
| 3,203,701 | 8/1965 | Rosenthal | 274/47 |
| 3,231,283 | 1/1966 | Stanton | 274/23 R |
| 3,645,541 | 2/1972 | Robertson-Aikman | 274/23 R |
| 3,822,065 | 7/1974 | Arbib | 274/47 |

FOREIGN PATENT DOCUMENTS

| | | | |
|---|---|---|---|
| 1,240,577 | 4/1960 | France | 274/47 |

*Primary Examiner*—Richard E. Aegerter
*Assistant Examiner*—John W. Shepperd
*Attorney, Agent, or Firm*—Reising, Ethington, Barnard, Perry & Brooks

[57] ABSTRACT

An arm record cleaner of the disclosure incorporates threaded connections for adjusting the vertical position of a cleaner arm and the tracking pressure applied by a pivotally mounted cleaning head member on a front end of the arm to a record being cleaned. A base of the cleaner supports the lower end of a vertical post by one threaded connection and the upper end of the post mounts an intermediate portion of the arm. On the opposite side of the post from the cleaning head, the arm includes a rear end on which a counterbalance is supported by another threaded connection to provide the control of the tracking pressure. The cleaning member has a soft pile covered cleaning edge and a brush and is pivotally mounted on the cleaning head so that the cleaning edge and brush balance the pressure applied to a record being cleaned. One preferred embodiment includes a rotatable nut of the base that moves the post up and down. Another preferred embodiment includes a threaded hole in the base receiving the lower threaded end of the post and also includes a spring clip that pivotally secures the cleaning member to the cleaning head.

10 Claims, 8 Drawing Figures

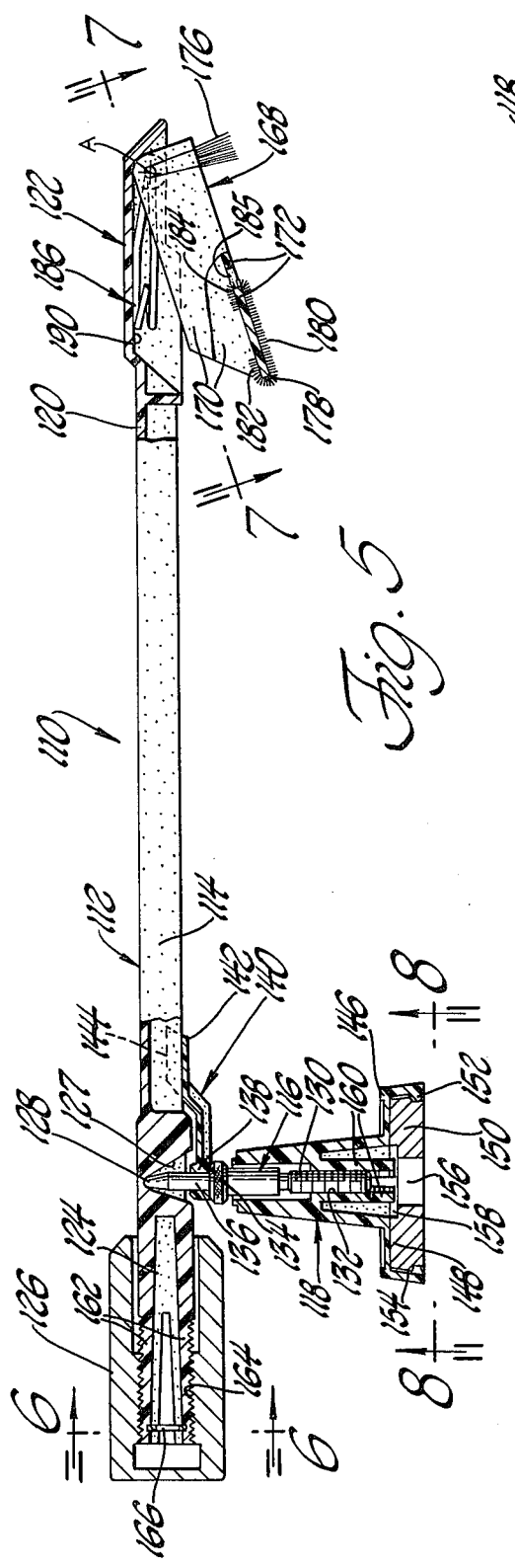
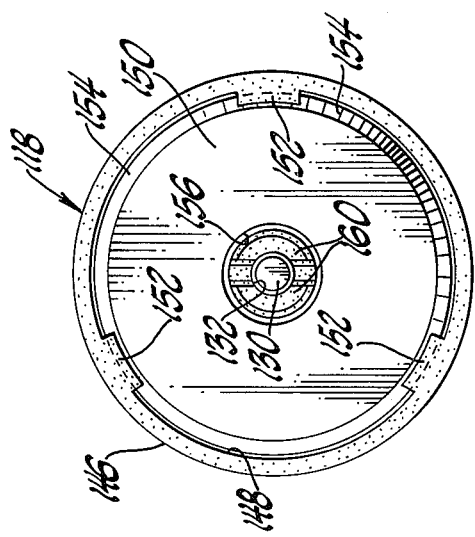
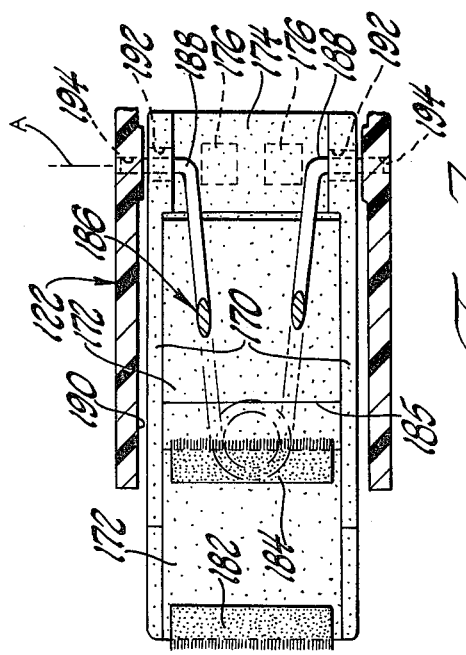
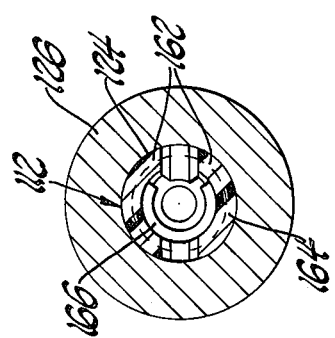

ARM RECORD CLEANER

This application is a continuation-in-part of application Ser. No. 737,296, filed Nov. 1, 1976, now abandoned, the entire disclosure of which is hereby incorporated by reference.

BACKGROUND OF THE INVENTION

1. Field of the Invention

The present invention relates to an arm record cleaner of the type that may be supported adjacent a rotatable turntable to track along a record rotated thereby so as to provide cleaning of the record grooves while the record is being played.

2. Description of the Prior Art

Arm record cleaners have heretofore been utilized to clean records as the records are rotated on a turntable. These cleaners include an arm with a cleaning head that tracks along the record grooves in the same manner as the tone arm sensing head that senses the sound recorded within the grooves. Certain problems have been encountered with these prior arm record cleaners.

Vertical adjustment of the arm record cleaners has not heretofore been completely satisfactory due to the vertical supports which have been utilized. Conventionally, a vertical pin is received within a frustoconical hole that extends through the arm in a downwardly pointing orientation. Upward and downward movement of the arm on the pin is permitted to give the proper vertical height. However, this construction does not allow for the use of a counterbalance on the rear end of the arm opposite the front end which supports the cleaning head. Nevertheless, the vertical adjustment is necessary since the cleaner must sometimes be mounted on a sprung metal frame which supports the record turntable and sometimes on a base that supports the metal frame from a different elevation. Also, cleaners of this type which have not been vertically adjustable have incorporated counterbalances that are positioned by set screws, friction, or notch adjustments to control the tracking pressure between the cleaning head and the record. These adjustments have not been satisfactory in accurately controlling the tracking pressure.

Cleaning heads of the arms have heretofore utilized brushes and/or cleaning projections with soft pile coverings for cleaning the records. Best cleaning can be achieved when both a brush and a soft pile covered projection are utilized. Usually, the cleaning projections have taken the form of rollers that engage the record. Proper positioning of the brush and the cleaning projection on the head relative to each other is necessary so that each applies a portion of the tracking pressure to the record and thereby provides an effective cleaning function, the brush loosening dust accumulation within the record grooves and the cleaning projection also loosening and removing the dust accumulation as well as removing any static electrical charge the record has acquired. In connection with removing the electrical charge, the cleaning projection preferably is slightly dampened or moistened with a cleaning liquid. Also, the brush is preferably angularly oriented so as to drag along the record with the centerline through its bristles angularly oriented approximately 20° to 30° from the vertical. This positioning and angular orientation must also be maintained when two or more records are on the turntable.

U.S. Pat. Nos. 3,203,701 and 3,822,065 disclose known arm record cleaners.

SUMMARY OF THE INVENTION

An object of the invention is to provide an arm record cleaner including an arm supported by the upper end of a vertical post whose lower end has a threaded connection to a base for vertically adjustable movement, and wherein the arm has a rear end with a threaded connection to a counterweight that is rotated to control pressure applied to a record by a brush and soft pile covered edge of a cleaning member that is pivotally mounted on a cleaning head at a front end of the arm with the cleaning edge located between the brush and the post.

In carrying out the above object and other objects of the invention, one preferred embodiment of the arm record cleaner includes a base of an L shape with a lower leg that is secured adjacent a record turntable by double-sided tape. An upper leg of the base supports a post having an upper end with a pivotal connection that supports an intermediate portion of an arm of the cleaner for vertically adjustable movement. A rear end of the arm is threaded to receive a threaded counterbalance and a front end of the arm supports a cleaning head for cleaning a record that is rotating on the adjacent turntable. Threading adjustment of the counterbalance controls tracking pressure between the cleaning head and the record in an accurately controlled manner.

A vertical hole in the upper leg of the base receives a lower threaded end of the post and a horizontal opening in this leg communicates with the hole and receives a nut into which the post is threaded such that nut rotation moves the post and the arm vertically. An upper portion of the upper leg includes a journal that encircles the vertical hole and pivotally mounts the inner end of an arm support that has an outer end on which the intermediate portion of the arm is supported when the cleaner is not being used. A downwardly opening depression in the intermediate portion of the arm receives the upper end of the post whose pivotal connection supports the arm.

During assembly, the threaded counterbalance is received by the front end of the arm which has a smaller size than the rear end. After rearward movement of the counterbalance and threading thereof onto the rear end of the arm, an unthreaded forward portion of the counterbalance engages the forwardmost threads to limit rearward threading adjustment of the counterbalance. A stop on the counterbalance engages the rear end of the arm to limit forward threading adjustment.

At the front end of the cleaning arm, a cleaning member is pivotally supported on the cleaning head and includes a brush and a soft pile covered cleaning edge located between the brush and the post. Cleaning pressure is applied to a record being cleaned by the brush and the pile covered cleaning edge under the control of the counterweight position. The pivotal support axis of the cleaning member to the cleaning head is located within a downwardly facing opening in the head.

Another preferred embodiment of the arm record cleaner, includes a cleaning arm with an intermediate portion between its front and rear ends having a downwardly facing opening that receives the pointed upper end of a post whose lower end is threaded into a threaded vertical hole of the cleaner base. A downwardly facing opening of the base, which is molded from plastic, receives a metal weight which is retained within the base opening by spaced retaining projections. Intermediate its upper and lower ends, the post has a journal which mounts the inner end of an arm support whose outer end receives the arm during periods of nonuse.

At its front end, the arm includes a cleaning head with a downwardly facing opening that receives a cleaning member. Spaced side walls of the cleaning member are connected by a lower web and are pivotally connected to the head by pintle portions of a spring wire clip. A first end of the web includes a brush and a second end thereof includes a soft pile covered cleaning edge located between the brush and the post. Cleaning pressure applied to the record is balanced between the brush and the pile covered cleaning edge by the pivoting movement of the cleaning member.

At its rear end, the cleaner arm includes threaded end portions that receive a metal threaded counterweight whose rotational movement positions it relative to the cleaning head to control the cleaning pressure applied to a record. Preferably, the counterweight has female threads and the threaded end portions of the cleaner arm have male threads with a resilient expander forcing the male threads into engagement with the female threads. Use of the expander allows the cleaner arm to be molded from plastic with its threads tightly engageable with the counterweight threads such that counterweight rotation and movement will not take place except when a deliberate manual effort is applied to the counterweight.

The objects, features and advantages of the present invention are readily apparent from the following detailed description of the preferred embodiments taken in connection with the accompanying drawings.

BRIEF DESCRIPTION OF THE DRAWINGS

FIG. 5 is a view taken in the same direction as FIG. 2 of another preferred embodiment of the arm record cleaner;

FIG. 6 is a sectional view taken along line 6—6 of FIG. 5;

FIG. 7 is a view partially in section taken along line 7—7 of FIG. 5; and

FIG. 8 is a bottom view taken along line 8—8 of FIG. 6.

DETAILED DESCRIPTION OF THE PREFERRED EMBODIMENTS

Figure 1:
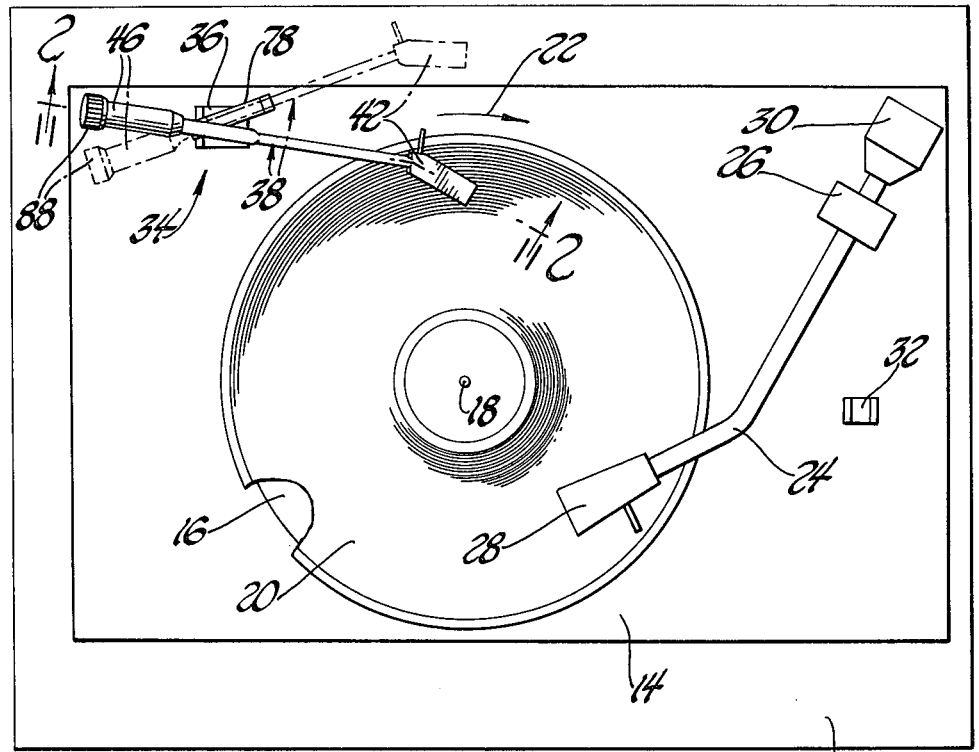
FIG. 1 is a top plan view of a phonograph record turntable assembly having one preferred embodiment of an arm cleaner constructed according to the present invention.

Referring to FIG. 1, a phonograph record turntable assembly indicated collectively by 10 includes a wooden or plastic base 12 on which a sprung turntable frame 14 is supported in a conventional manner. A turntable 16 supported by frame 14 has a center pin 18 that receives the central hole of a record 20 which is supported for rotatable movement about the pin in a clockwise direction as shown by arrow 22. To the right of the record turntable 16, a tone arm 24 is supported by a gimble mount 26 on frame 14 and has a sensing head 28 for tracking along the record grooves to provide sound sensing. A counterbalance 30 controls the tracking pressure of head 28 during use, while a support 32 on frame 14 receives the tone arm 24 during periods of nonuse. At the upper left-hand corner of frame 14 as viewed in FIG. 1, one embodiment of an arm record cleaner according to the present invention is indicated by 34 and supported on the frame 14 to provide cleaning of record 20 as it is being rotated with or without the tone arm 24 being used to sense the sound recorded in the record grooves. In addition to being mounted on the frame 14, the cleaner 34 may also be mounted on the base 12 depending on the configuration of the particular turntable assembly 10 with which the cleaner is being used. Since these turntable frames and bases on which the frames are sprung generally have different heights, vertical adjustment of the cleaner is provided in a manner subsequently described so that the cleaner is properly angularly oriented with respect to a record being cleaned.

Figure 2:
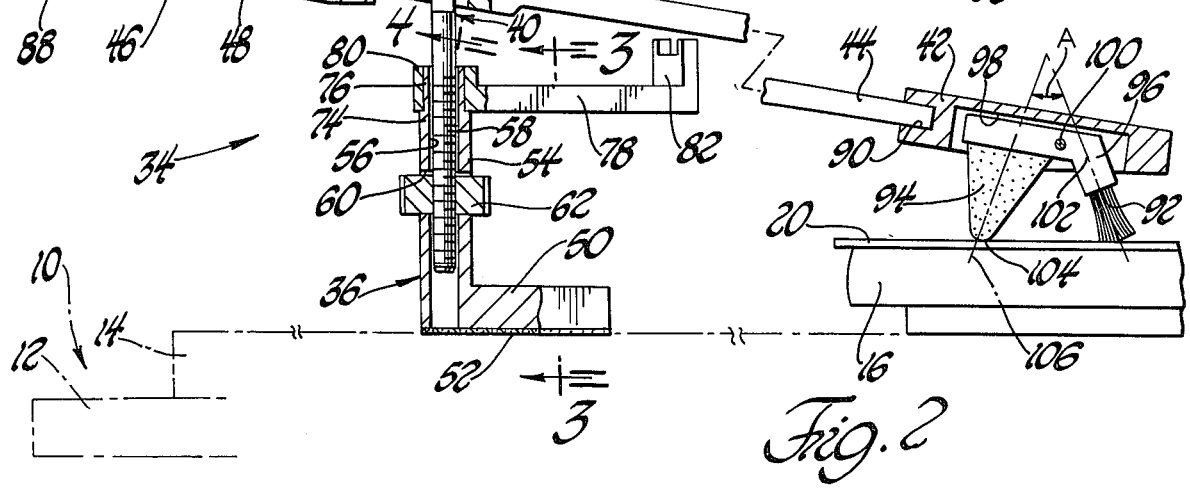
FIG. 2 is a view partially in section of the cleaner taken along line 2—2 of FIG. 1.

With additional reference to FIG. 2, cleaner 34 includes a base 36 on which an arm 38 is supported by a post 40 for tracking movement along the record 20. Proper vertical positioning of a cleaning head 42 supported on a front end 44 of the arm is accurately controlled by adjustment of a first threaded connection of the post 40 to base 36 in a manner described hereinafter. A counterbalance 46 is mounted on a rear end 48 of the arm by a second threaded connection to permit fine adjustment of the tracking pressure between the cleaning head 42 and the record 20.

Figure 3:
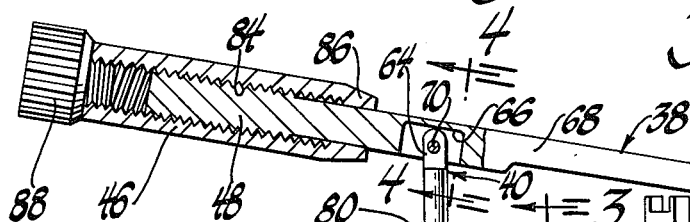
FIG. 3 is a sectional view of the cleaner taken along line 3—3 of FIG. 2.
Figure 3:
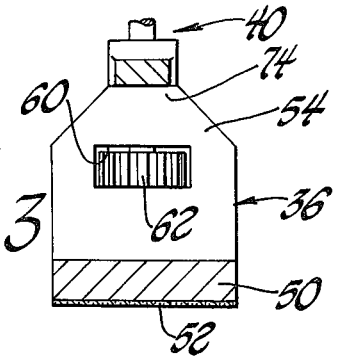

As seen in FIGS. 2 and 3, cleaner base 36 has an L shape including a lower horizontal leg 50 secured to the frame 14 by double-sided tape 52. A vertical upper leg 54 of the base includes a vertical hole 56 that receives the lower threaded end 58 of post 40. A horizontal opening 60 in the uppr leg 54 communicates with the hole 56 and receives a nut 62 into which the post end 58 is threaded. Rotation of nut 62 in opposite directions moves post 40 upwardly and downwardly to control the vertical positioning of arm 38 relative to the record 20. Thus, different turntable assemblies whose turntables have different elevations relative to their associated sprung frames and their bases may use the cleaner which may be mounted on either the frame or base and vertically adjusted to the proper position.

Figure 4:
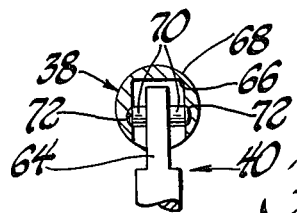
FIG. 4 is an enlarged sectional view of the cleaner taken along line 4—4 of FIG. 2.

As seen by combined reference to FIGS. 2 and 4, an upper end 64 of post 40 is received within a downwardly opening depression 66 in an intermediate portion 68 of arm 38. A pivotal connection between the arm portion 68 and the post end 64 is provided by shaft portions 70 that project horizontally from the uppr post end in opposite directions. Outer ends of shaft portions 70 are received within shallow rounded holes 72 in the arm portion 68 within the depression 66. This construction allows the arm 38 to be assembled to the post 40 by inserting the post end 64 upwardly into the depression 66 and then twisting the post so that its shaft portions 70 deflect into the holes 72 with a snap action that completes the pivotal connection.

An upper portion 74 of the vertical base leg 54 has an upwardly tapered shape as shown in FIG. 3 and includes a journal 76 (FIG. 2) encircling the vertical hole 56 that receives the post 40. A cleaner arm support 78 has an inner end 80 pivotally mounted by journal 76 for adjustable movement about the vertical axis of hole 56. An outer end 82 of support 78 is bifurcated and has an upwardly opening shape that receives the intermediate arm portion 68 during periods of nonuse as shown by phantom line representation in FIG. 1.

Counterbalance 46, as seen in FIG. 2, includes a central hole 84 whose rear left-hand portion includes female threads that thread onto male threads on the rear end 48 of arm 38. A forward portion 86 of the counterbalance is unthreaded about hole 84 and limits rearward threading adjustment of the counterbalance on the arm. Assembly of the counterbalance is achieved prior to connection of the post 40 and the cleaning head 42 to the arm 38. The counterbalance is inserted over the smaller front end 44 of the arm and moved along the tapering shape of the arm to its larger rear end 48. Threads of the rear end 48 have a minor diameter the same as the diameter of the arm just forward of its threaded end 48 and have a major diameter large than the diameter of the hole 84 at the forward portion 86 of the counterbalance. This screw structure thus provides for limiting of the rearward counterbalance adjustment as the forward counterbalance portion 86 engages the forwardmost threads on the threaded rear arm end 48. Also, a stop 88 is threaded into the left-hand end of counterbalance hole 84 after the counterbalance is mounted on arm 38. Stop 88 axially engages the rear threaded end 48 of arm 38 to limit the forward adjustment of the counterbalance 46.

As seen in FIG. 2, the cleaning head 42 includes an opening 90 into which the front arm end 44 is press fitted to secure the head. A brush 92 and a cleaning projection 94 of a cleaning member 96 are positioned below a downwardly facing opening 98 in the cleaning head. A shaft 100 pivotally mounts the cleaning member 96 so that the brush 92 and the cleaning projection 94 are mounted for coordinated movement with each other relative to the head about a common axis and thereby balance cleaning pressure applied to the record 20 by the cleaning head, this cleaning pressure also providing tracking of the cleaning arm along the record and being the weight of the cleaning head that is unbalanced by the counterbalance 46. Bristles of brush 92 are aligned with a centerline 102 of the brush. Cleaning projection 94 includes a covering of a soft pile with small fibers for cleaning the record and has a pointed shape oriented downwardly with a cleaning edge 104 that is located between the brush 92 and the post 40 to engage and clean the record. A centerline 106 of pointed projection 94 bisects the included angle defined thereby and defines an included angle A with the brush centerline 102. Best cleaning results are achieved when the included angle A between the centerlines 102 and 106 is an acute angle of about 60 degrees.

Cleaning of a record by the cleaner 34 proceeds with its cleaning head 42 tracking along the record in a dragging manner like the tone arm head 28. During the cleaning, the cleaning projection 94 leads the trailing brush 92 whose bristles are angularly oriented relative to the vertical in a dragging manner so as to loosen dust accumulation within the record grooves. The soft pile covering of cleaning projection 94 also loosens and picks up dust accumulation within the record groove. Best results are achieved when a slight amount of a suitable cleaning liquid is used to slightly dampen the rounded end 104 of the cleaning projection. Static electrical charge on the record is then also removed by the dampened cleaning projection 94. After cleaning of one or more records, a suitable brush may be used to clean the dust accumulation that is picked up on the cleaning projection edge 104.

With reference to FIG. 5, another preferred embodiment of the arm record cleaner is indicated generally by 110 and includes a molded plastic arm 112 with an intermediate portion 114 supported by a post 116 on a molded plastic base 118 by a threaded connection that permits vertical adjustment of the arm position in a manner that is hereinafter described. A front end 120 of the arm 112 includes a cleaning head 122. A rear end 124 of arm 112 has a threaded connection which mounts a metal counterweight 126 in a manner hereinafter described so that rotation of the counterweight positions it relative to the cleaning head 122 to control the degree of pressure applied to a record being cleaned.

Intermediate arm portion 114 includes a downwardly facing depression 127 that receives a pointed upper end 128 of the post 116. A lower end 130 of post 116 has male threads and is received within a vertical hole 132 in the base with female threads. Arm 112 can be freely picked up from the upper post end 128 to permit post rotation that moves it upwardly and downwardly as required for proper vertical positioning of the arm once it is remounted on the post. An intermediate portion of the post includes an enlarged diameter stop 134 for limiting downward movement. Above the stop 134, the post 116 includes a journal 136 which pivotally supports the inner end 138 of an arm support 140. An outer end 142 of the arm support 140 has an upwardly opening yoke shape including spaced portions 144 (only one shown) between which the arm is received during periods of nonuse as shown. Upward movement of the arm at its cleaning head 122 so that the rear end 124 of the arm moves downwardly moves the intermediate arm portion 114 from between the support portions 144 so that the cleaning head can be positioned on a record to provide a cleaning action.

Below the threaded hole 132 of the molded plastic base 118, an enlarged diameter disk portion 146 of the base defines a downwardly facing opening 148 of a round shape. A round metal weight 150 of the base is received within the opening 148 and is retained therein by spaced retaining projections 152 of the base (see FIG. 8) which snap over an annular ledge 154 of the weight. A central hole 156 of weight 150 receives the lower threaded end 130 of the post as the post is threaded downwardly. At the upper end of the hole 156 as seen in FIG. 5, a counterbore 158 of the hole receives the lower ends of threaded base portions 160 which define the threaded hole 132. Base portions 160 are spaced from a frustoconical base portion 162 that extends upwardly from the disk portion 146 toward the post stop 134. Base portions 160 are molded with female threads spaced from each other close enough to tightly engage the male threads of the lower post end 132 and to thereby prevent rotation of the post except when deliberate manual effort is applied to it.

With combined reference to FIGS. 5 and 6, rear arm end 124 includes a pair of end portions 162 that are spaced from each other extending away from the cleaning head 122. Male threads of the end portions 162 are engaged with female threads of a central hole 164 in the counterweight 126 into which the rear arm end is inserted. An expander 166 is received between the arm end portions 162 and resiliently biases these end portions away from each other so as to maintain a tight fit between the engaged threads. As shown, the expander 166 takes the form of a split ring whose size in a free condition is greater than shown in FIG. 6 so as to provide the resilient biasing of the end portions 162. Use of the expander allows the threads of the arm end portions to be molded from plastic and still prevent rotation of counterweight 126 during use except when a deliberate manual effort is applied to the counterweight. Rotation of the counterweight 126 in one direction moves it toward the cleaning head 122 so as to increase the pressure applied to a record being cleaned. Rotation of the counterweight 126 in the opposite direction moves the counterweight away from the cleaning head 122 and thereby lessens the pressure applied by the cleaning head to a record.

With reference to FIGS. 5 and 7, the cleaning head 122 includes a cleaning member 168 pivotally supported along a horizontal axis A. Spaced side walls 170 of cleaning member 168 are interconnected by a lower web 172. One end of web 172 includes a lug 174 that mounts a pair of brushes 176 in a side-by-side relationship. A second end of the web 172 includes a cleaning edge 178 located toward the post 116 from the brushes 176 and having a covering of a soft pile material 180. A suitable adhesive is utilized to secure one end 182 of the pile material to the upper side of the second web end and to also secure another end 184 of the pile material to the upper side of the web after it is inserted upwardly through an intermediate web opening 185. A spring wire clip 186 shown in FIG. 7 includes pintle portions 188 that pivotally support the side walls 170 adjacent the web lug 174 within a downwardly facing opening 190 (FIG. 5) of the cleaning head along axis A. Each pintle portion is received within aligned holes 192 and 194 of the side walls 170 and the cleaning head 122 to provide this pivotal support as shown in FIG. 7. Cleaning action of a record takes place generally in the same manner previously described in connection with the other embodiment of the cleaner, with both the pile covered cleaning edge 178 and the brushes 176 removing dust and other accumulation from the record.

While preferred embodiments of the arm record cleaner have herein been described in detail, those skilled in the art will recognize various alternative designs and embodiments for practicing the present invention as defined by the following claims.

What is claimed is:

1. An arm record cleaner comprising: a base; a cleaner arm including a front end having a cleaning head and a rear end as well as an intermediate portion between the ends; a vertical post having an upper end that supports the intermediate portion of the arm and a lower end that projects downwardly from the arm; a first threaded connection that supports the lower end of the post on the base for vertically adjustable movement; a cleaning member pivotally supported on the cleaning head and including a brush and a soft pile cleaning edge positioned toward the post from the brush; a counterweight; and a second threaded connection that supports the counterweight on the rear end of the arm for movement toward and away from the cleaning head upon counterweight rotation so as to control the pressure between the head and a record being cleaned.

2. A cleaner as in claim 1 further including an arm support extending outwardly from the post and having an outer end for supporting the arm during periods of nonuse.

3. A cleaner as in claim 2 wherein the post includes a journal intermediate the upper and lower ends thereof, and the arm support having an inner end supported by the journal.

4. A cleaner as in claim 1 wherein the base includes a vertical hole that receives the lower end of the post which includes threads, a horizontal opening in the base communicating with the vertical hole, a rotatable nut received within the opening and threadingly receiving the lower end of the post such that nut rotation moves the post and the arm vertically, the intermediate portion of the arm including a downwardly opening depression that receives the upper end of the post, and a pivotal connection within the depression for supporting the intermediate portion of the arm on the upper end of the post.

5. A cleaner as in claim 1 wherein the first threaded connection includes spaced portions of the base that have female threads and also includes a lower threaded end of the post with male threads tightly engaged by the female threaded base portions, and the second threaded connection including a hole in the counterweight having female threads and a plurality of end portions of the rear arm end, each arm end portion having male threads thereon, and an expander that biases the arm end portions away from each other to maintain engagement of the female and male threads thereof.

6. A cleaner as in claim 5 wherein the upper end of the post has a pointed shape, and the intermediate portion of the arm having a downwardly opening depression that receives the pointed upper end of the post to support the arm while being removable to permit post rotation and adjustment of the vertical position of the post.

7. A cleaner as in claim 1 wherein the base is molded from plastic and includes a downwardly facing opening, retaining projections on the base about the opening, and a weight received within the base opening and retained therein by the retaining projections.

8. A cleaner as in claim 1 wherein the cleaning member includes a lower web and side walls connected to the web in a spaced relationship to each other, said web having a first end where the brush is located and a second end including a pile covering defining the cleaning edge thereof, the cleaning head on the front end of the arm having an opening that faces downwardly to receive the side walls of the cleaning member adjacent the first end of the web, and a spring clip received between the side walls of the cleaning member and having pintle portions that pivotally interconnect the side walls and the cleaning head.

9. An arm record cleaner comprising: a base having a vertical hole with female threads; a cleaning arm including a front end having a cleaning head and a rear end as well as an intermediate portion connecting the ends; a downwardly opening depression in the intermediate portion of the arm; a post having a lower end with male threads that are threaded into the threaded hole of the base to support the post for vertically adjustable movement upon post rotation; said post having a pointed upper end received within the depression of the arm to support the arm on the base; the post having an intermediate journal between the upper and lower ends thereof; an arm support having an inner end supported by the journal of the post and an outer end that supports the arm during periods of nonuse; a cleaning member pivotally supported on the cleaning head and including a brush and a soft pile cleaning edge positioned toward the post from the brush; a counterweight having threads thereon; and the rear end of the arm having threads that receive the counterweight threads so as to support the counterweight for movement toward and away from the cleaning head upon counterweight rotation so as to control the pressure between the head and a record being cleaned.

10. An arm record cleaner comprising: a molded plastic base having spaced portions with female threads defining a vertical hole; a downwardly facing opening in the base and retaining projections spaced thereabout; a metal weight received within the base opening maintained therein by the retaining projections; a cleaning arm including a front end having a cleaning head and a rear end as well as an intermediate portion connecting the ends; a downwardly opening depression in the intermediate portion of the arm; a post having a lower end with male threads that are threaded into the threaded hole of the base to support the post for vertically adjustable movement upon post rotation; said post having a pointed upper end received within the depression of the arm to support the arm on the base; a journal on the post intermediate the upper and lower ends thereof; an arm support having an inner end mounted by the post journal and an outer end for supporting the arm during periods of nonuse; a cleaning member including a lower web and side walls; said web having a first end including a brush and a second end including a cleaning edge and a soft pile covering thereover; the cleaning head including a downwardly facing opening that receives the side walls of the cleaning member adjacent the first end of the web with the cleaning edge located between the post and the brush; a spring wire clip received between the side walls of the cleaning member and having pintle portions that pivotally connect the side walls with the cleaning head; a metal counterweight having a hole with female threads; the rear end of the arm including end portions having male threads that receive the threads of the counterweight hole to support the counterweight for movement toward and away from the cleaning head upon counterweight rotation so as to control the pressure between the head and a record being cleaned; and a resilient expander that biases the threaded end portions of the rear arm end into engagement with the counterweight threads.

* * * * *